(12) United States Patent
Følkner (10) Patent No.: US 12,456,568 B2
(45) Date of Patent: Oct. 28, 2025

(54) PRESSURE COMPENSATOR AND ASSEMBLY COMPRISING A SUBSEA INSTALLATION AND SUCH A PRESSURE COMPENSATOR

(71) Applicant: FMC Kongsberg Subsea AS, Kongsberg (NO)

(72) Inventor: Stein Følkner, Østerås (NO)

(73) Assignee: TechnipFMC Norge AS, Kongsberg (NO)

( * ) Notice: Subject to any disclaimer, the term of this patent is extended or adjusted under 35 U.S.C. 154(b) by 194 days.

(21) Appl. No.: 17/766,240

(22) PCT Filed: Oct. 1, 2020

(86) PCT No.: PCT/EP2020/077510
§ 371 (c)(1),
(2) Date: Apr. 2, 2022

(87) PCT Pub. No.: WO2021/064098
PCT Pub. Date: Apr. 8, 2021

(65) Prior Publication Data
US 2024/0047117 A1     Feb. 8, 2024

(30) Foreign Application Priority Data
Oct. 2, 2019  (NO) .................................. 20191180

(51) Int. Cl.
*H01F 27/02* (2006.01)
*F15B 1/02* (2006.01)
(Continued)

(52) U.S. Cl.
CPC .......... *H01F 27/022* (2013.01); *F15B 1/025* (2013.01); *F15B 1/08* (2013.01); *F15B 1/103* (2013.01);
(Continued)

(58) Field of Classification Search
CPC .. F15B 1/025; F15B 1/08; F15B 1/103; F15B 3/00; F15B 7/10; F15B 21/006; H01F 27/022
See application file for complete search history.

(56) References Cited

U.S. PATENT DOCUMENTS

| | | | | |
|---|---|---|---|---|
| 1,950,107 A | * | 3/1934 | Guinn ..................... | F15B 1/103 138/30 |
| 2,773,482 A | * | 12/1956 | Dickie ..................... | G01M 7/04 92/39 |

(Continued)

FOREIGN PATENT DOCUMENTS

| | | |
|---|---|---|
| EP | 2 169 690 A1 | 3/2010 |
| EP | 2 610 881 A1 | 7/2013 |

(Continued)

*Primary Examiner* — Matthew Wiblin (57) ABSTRACT

The invention proposes a double barrier pressure compensator for performing a pressure compensation between seawater surrounding a subsea installation and a medium filling a volume of the subsea installation. Said pressure compensator comprises: —a housing (20) having a first opening (202b) and a second opening (30); —a first bellows (4) and a second bellows (5) arranged one above the other within the housing (20) and each sealingly fixed to the housing (20) at their distal ends (43, 53); —a moving separation element (6) adapted to move inside the housing (20) and sealingly fixed to each of the proximal ends (44, 54) of the first and second bellows (4, 5) so as to separate a first compartment (21) from a second compartment (22) of the housing (20) sealed with respect to each other. Said pressure compensator (2) further comprising a third compartment (23) formed by a space between the housing (20) and the first and second bellows (4, 5), the first compartment (21) being arranged to be fluidly connected to the subsea installation (1) through the second opening (30), the second compartment (22) being arranged to be in communication with sea water through the first opening (202b), and said third compartment (23) being filled with a barrier medium.

23 Claims, 4 Drawing Sheets

(51) Int. Cl.
  *F15B 1/08*    (2006.01)
  *F15B 1/10*    (2006.01)
  *F15B 3/00*    (2006.01)
  *F15B 7/10*    (2006.01)
  *F15B 21/00*   (2006.01)

(52) U.S. Cl.
  CPC .................. *F15B 3/00* (2013.01); *F15B 7/10* (2013.01); *F15B 21/006* (2013.01)

(56) References Cited

U.S. PATENT DOCUMENTS

| | | | | |
|---|---|---|---|---|
| 3,424,202 | A * | 1/1969 | Lincicome | F16L 51/03 |
| | | | | 138/31 |
| 10,026,537 | B2 * | 7/2018 | Bjoerkhaug | H01F 27/343 |
| 11,212,931 | B2 * | 12/2021 | Launonen | H05K 5/068 |
| 2005/0155658 | A1 * | 7/2005 | White | F16L 55/053 |
| | | | | 138/30 |
| 2013/0167962 | A1 * | 7/2013 | Skjetne | E21B 43/01 |
| | | | | 138/30 |
| 2015/0188297 | A1 * | 7/2015 | Boe | H05K 7/20263 |
| | | | | 174/564 |
| 2017/0085071 | A1 * | 3/2017 | Burrow | H02G 3/22 |
| 2020/0011384 | A1 * | 1/2020 | Arikawa | F15B 3/00 |

FOREIGN PATENT DOCUMENTS

| | | |
|---|---|---|
| EP | 2 660 422 A1 | 11/2013 |
| EP | 3 048 619 A1 | 7/2016 |
| WO | WO 2015/185325 A1 | 12/2015 |

\* cited by examiner

PRESSURE COMPENSATOR AND ASSEMBLY COMPRISING A SUBSEA INSTALLATION AND SUCH A PRESSURE COMPENSATOR

FIELD OF THE INVENTION

The present invention relates to a pressure compensator for a subsea installation. The invention further relates to an assembly comprising a subsea installation and such a pressure compensator.

BACKGROUND OF THE INVENTION

Subsea installations refer to assemblies used under water. Such subsea installations may in particular include compressors, pumps, motors, transformers and any other electrically powered subsea equipment.

Such subsea installations, for example transformers, may be installed at water depths of 3,000 m or more, so that they are exposed to pressures up to or even in excess of 300 bars. To protect such components from the seawater and to handle the high pressures prevailing in such subsea environment, these components are provided with subsea enclosures. For providing relatively compact and lightweight enclosures, pressure compensated enclosures may be used. The pressure compensated enclosure is generally filled with a medium, and components operated inside the pressure compensated enclosure are made to be operable under high pressures. For instance, said installations are placed inside a tank which is filled with a medium, e.g. a dielectric medium such as transformer oil, in order to protect the installations and ensure optimal working conditions. The tank is usually filled with the medium under 20° C. and atmospheric pressure. Once the filling of the tank is achieved, the pressure inside the tank is substantially equal to normal atmospheric pressure.

Water temperature variations, hydrostatinc pressure and heat produced by the subsea installation while operating also result in volume variations of the medium inside the subsea installation. Said volume variations may cause the deterioration of the tank or equivalent containing the medium as the latter is usually rigid.

In this context, the use of pressure compensators is known. Document EP 2 169 690 discloses such a pressure compensator, comprising two bellows arranged one inside the other, providing therefore a double barrier separating oil from the surrounding sea water.

The configuration of the disclosed pressure compensator is such that there is always a need to compensate the volume variations inside the space between the two bellows.

Moreover, even with a double barrier, such a compensator remains fragile, in particular with respect to lateral shocks.

The invention seeks to provide a double barrier pressure compensator which is able to address at least one of the aforesaid drawbacks.

SUMMARY OF THE INVENTION

The invention proposes a double barrier pressure compensator for performing a pressure compensation between seawater surrounding a subsea installation and a medium filling a volume of the subsea installation.

According to the invention, said pressure compensator comprises:
  a housing having a first opening and a second opening;
  a first bellows and a second bellows arranged one above the other within the housing;
  a moving separation element adapted to move inside the housing, opposite locations of said moving separation element being sealingly fixed to proximal ends of the first and second bellows so as to separate a first compartment from a second compartment of the housing.

Each of the first bellows and the second bellows has a distal end sealingly fixed to the housing.

According to the invention, said first compartment and second compartment are sealed with respect to each other. Said pressure compensator further comprises a third compartment formed by a space between the housing and the first and second bellows, where the first compartment is arranged to be fluidly connected to the subsea installation through the second opening, the second compartment being arranged to be in communication with sea water through the first opening, and said third compartment is filled with a barrier medium.

Thanks to these provisions, the pressure compensator is compact, provides a double barrier for the first bellows thanks to the housing and the tight seal between the three compartments, does not require the use of an additional compensator for the third compartment for most of the situations, and provides a lateral protection of the bellows thanks to the housing.

Moreover, such a pressure compensator avoids the risk of jamming which can occur with the multiplicity of rods of EP 2169690.

According to advantageous provisions of the present invention, which may be combined:
  the housing comprises a cylinder extending between a first transverse plate and a second transverse plate of the housing, said first transverse plate being provided with said first opening and said second transverse plate being provided with said second opening.
  the moving separation element is a moving plate.
  the first and second bellows have individual capped ends joined together to form the moving separation element.
  the first and second bellows are sealingly welded, soldered and/or flanged to the housing and the moving separation element at their respective two ends.
  the pressure compensator comprises a rod fixed to the moving separation element and protruding from the housing through a bore arranged therein, the rod being designed for monitoring the level of medium inside the housing.
  said bore is an axial bore.
  the bore for the rod is adapted to guide the movement of the rod and thus the rod aligns and guides the movement of the moving separation element.
  the moving separation element comprises an extension configured to be in contact with an internal lateral face of the housing so as to help guiding the movement of the moving separation element.
  the pressure compensator comprises an elastic member sandwiched between the housing and the moving separation element in the second compartment communicating with the first opening, to pre-charge the compensator.
  the elastic member is a spring mounted on the rod.
  the pressure compensator it comprises a second pressure compensator with bellows or a bladder, connected to the pressure compensator for compensating variations of the volume of the barrier medium in the third compartment.

the first and second bellows are made of metal or elastomer.

the medium and/or the barrier medium is a dielectric fluid.

The present invention also proposes an assembly comprising a subsea installation and a pressure compensator as defined above.

According to a feature, the housing of the pressure compensator is mounted on the subsea installation, the second opening being common to the pressure compensator and a tank of the subsea installation.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
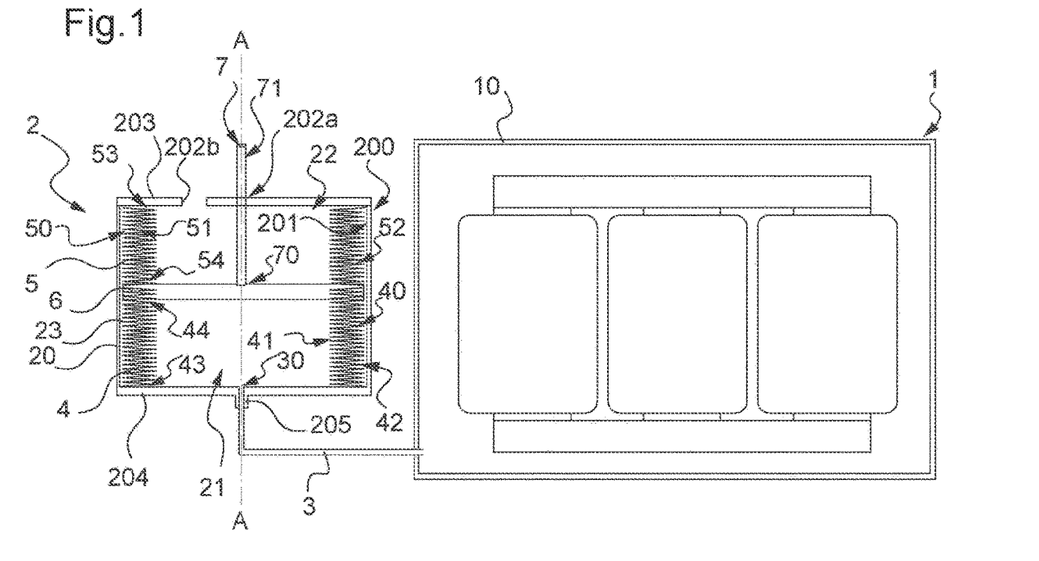
FIG. 1 is a schematic view of a transformer in flow connection with a pressure compensator through a duct, according to one embodiment of the invention.

FIG. 1 schematically represents a subsea installation 1 in flow connection through a duct 3 with a pressure compensator 2 according to one embodiment of the invention.

The subsea installation is here a transformer. The transformer 1 is a standard one, used to transform power into suitable voltage and current for subsea power consuming devices.

Indeed, the electrical power to be distributed to subsea power consuming devices may be supplied from land, e.g. an onshore power plant, or from an offshore power generating facility, e.g. on a ship or platform. The subsea power consuming devices usually have high power requirements, and electric power must usually be transferred across long distances. In order to provide an efficient power transfer across long distances, a high voltage is used for the remote power supply. The high voltage power supply is connected to a subsea power distribution device which includes the transformer that provides a lower voltage power supply and is connected to subsea power consuming devices.

The transformer 1 is accommodated in a tank 10. The tank 10 is filled with a dielectric medium, here a dielectric fluid and more precisely a transformer oil. The dielectric medium is able to circulate between the transformer 1 and the pressure compensator 2 through the duct 3 and is compatible with the electric components present in the tank 10.

Figure 2:
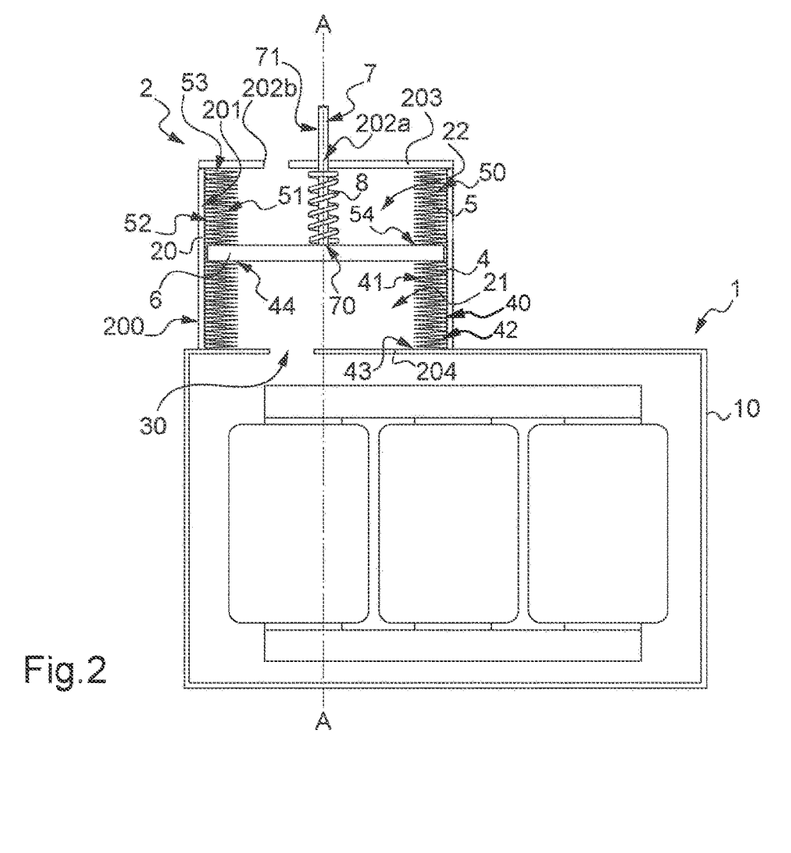
FIG. 2 is a schematic view of a transformer communicating through an opening with a pressure compensator similar to that of FIG. 1, according to another embodiment of the invention.

In another embodiment represented at FIG. 2, the pressure compensator 2 is directly connected to the transformer 1 through an opening 30. The pressure compensator 2 can therefore be welded, soldered or bolted sealingly to the tank 10.

The pressure compensator 2 of both embodiments comprises a housing 20. The housing 20 is designed to protect the pressure compensator 2 from the lateral shocks. The housing 20 provides indeed a protection against the surrounding sea water which presses laterally against the pressure compensator 2. The housing 20 is preferably symmetrically formed with respect to an axial direction or direction of axis A, and more preferably A is a revolution axis. The housing 20 presents here more precisely a cylindrical shape. The housing 20 comprises in practice a cylinder extending between an upper transverse plate 203 or first transverse plate, and a lower transverse plate 204 or second transverse plate and forming an external lateral face 200 and an internal lateral face 201. Transverse means here transverse relative to axis A. The external face 200 is in contact with sea water when the pressure compensator 2 is operating.

The housing 20 comprises two compartments in the direction of the axis A, namely a first compartment 21 and a second compartment 22, separated by a moving separation element or moving element 6. The first compartment 21 and the second compartment 22 are adjacent one to the other. In the embodiment of FIGS. 1 and 2, the moving element 6 is a transversely arranged plate.

The first compartment 21 is fluidically connected to the subsea equipment 1 through a second opening 30 via the duct 3 in the first embodiment of FIG. 1 and directly through said second opening 30 in the embodiment of FIG. 2. In the first embodiment, a collar 205 extending from the lower transverse plate 204 is used for the connection of the duct 3 to the pressure compensator 2. In the second embodiment, the second opening 30 is formed in a lower transverse plate and a side of the tank 10. The second opening 30 is therefore common to the lower transverse plate 204 and the tank 10. The dielectric oil can therefore circulate between the tank of transformer 1 and the first compartment 21.

The housing 20 also comprises a central through bore 202a or opening as well as a first opening 202b in the transverse upper plate 203. The first opening 202b is here designed for the ingress of seawater into compartment 22 to keep the pressure of the dielectric fluid close to the water pressure outside the transformer 1. The through bore 202a enables the guidance of the rod 7 when moving in the housing 20.

Of course, in another embodiment, the number of bores and openings may vary. The bore 202a and the first opening 202b can for example be constituted of a single opening/bore. Said opening or bore may therefore enable the ingress of seawater and at the same time, the guidance of the rod 7. This is for example the case in FIGS. 3 to 5.

The first compartment 21 is partly formed of a first bellows 4, here symmetrically arranged with respect to the direction of axis A. The second compartment 22 is partly formed of a second bellows 5, also symmetrically arranged with respect to the direction of axis A. The first bellows 4 and the second bellows 5 present a shape substantially similar to that of the housing 20, namely a cylindrical shape, and are here identical.

The first bellows 4 comprises an outer lateral face 40 and an inner lateral face 41. A first intermediate space 42 separates the outer face 40 of the first bellows 4 from the internal face 201 of the housing 20. Similarly, the second bellows comprises an outer lateral face 50 and an inner lateral face 51. A second intermediate space 52 separates the outer face 50 of the second bellows 5 from the internal face 201 of the housing 20. The first intermediate space 42 and the second intermediate space 52 form a continuous annular volume. Said annular volume form a third compartment 23 of the housing 20. The third compartment 23 is filled with a barrier fluid. The barrier fluid can be the same as or can be a medium different from the medium of subsea equipment 1.

The bellows 4 (respectively 5) has a fixed end 43 or distal end (respectively 53) sealingly attached to the lower (respectively upper) plate 204 (respectively 205) of housing 20, and a moving end 44 or proximal end (respectively 54), sealingly attached to the moving element 6 (here welded).

As the first compartment 21 and the second compartment 22 are hermetically sealed with respect to each other, the sea water entering the second compartment 22 does not enter the first compartment 21. The first bellows 4 is therefore protected from sea water. This configuration thus provides a double barrier for the first bellows 4.

The first bellows 4 and the second bellows 5 are able to expand and contract in the axial direction depending on the volume variation of the medium inside the housing 20, in particular inside the first compartment 21.

As the first bellows 4 and the second bellows 5 expand and contract axially in case of volume variation of the dielectric fluid, the volume of each of the first compartment 21 and second compartment 22 vary whilst the total volume of the housing 20 is constant. In other words, when the first bellows 4 contracts, the second bellows 5 expands axially, and vice versa.

The first bellows 4 and the second bellows 5 can be of formed or welded type. The first bellows 4 and the second bellows 5 can be identical or differ in shape and/or material.

Figure 5:
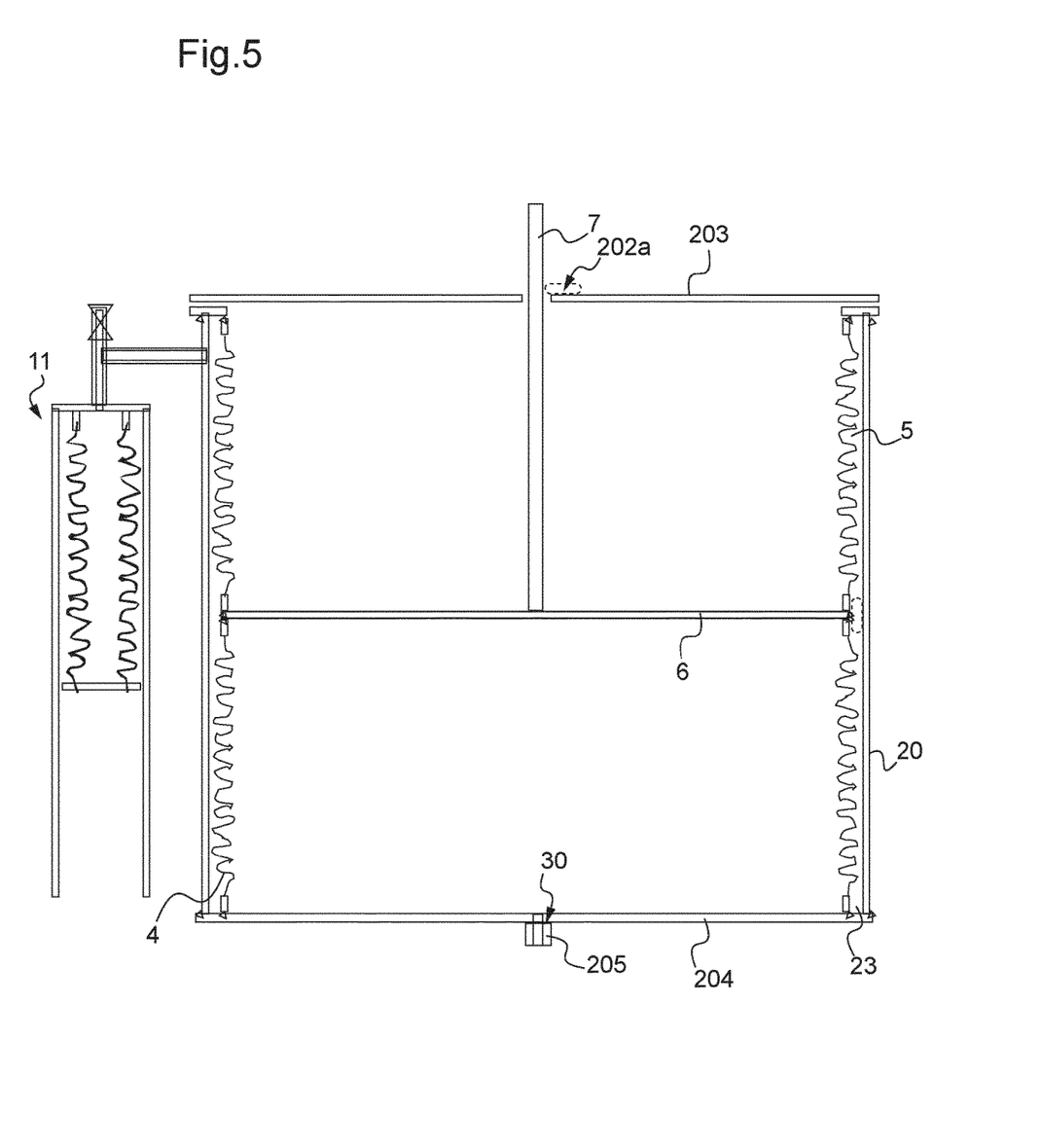

FIGS. 1, 2 and 5 represent embodiments in which the first bellows 4 and the second bellows 5 are identical. The first bellows 4 and the second bellows 5 are indeed made of metal and present the same shape.

Figure 3:
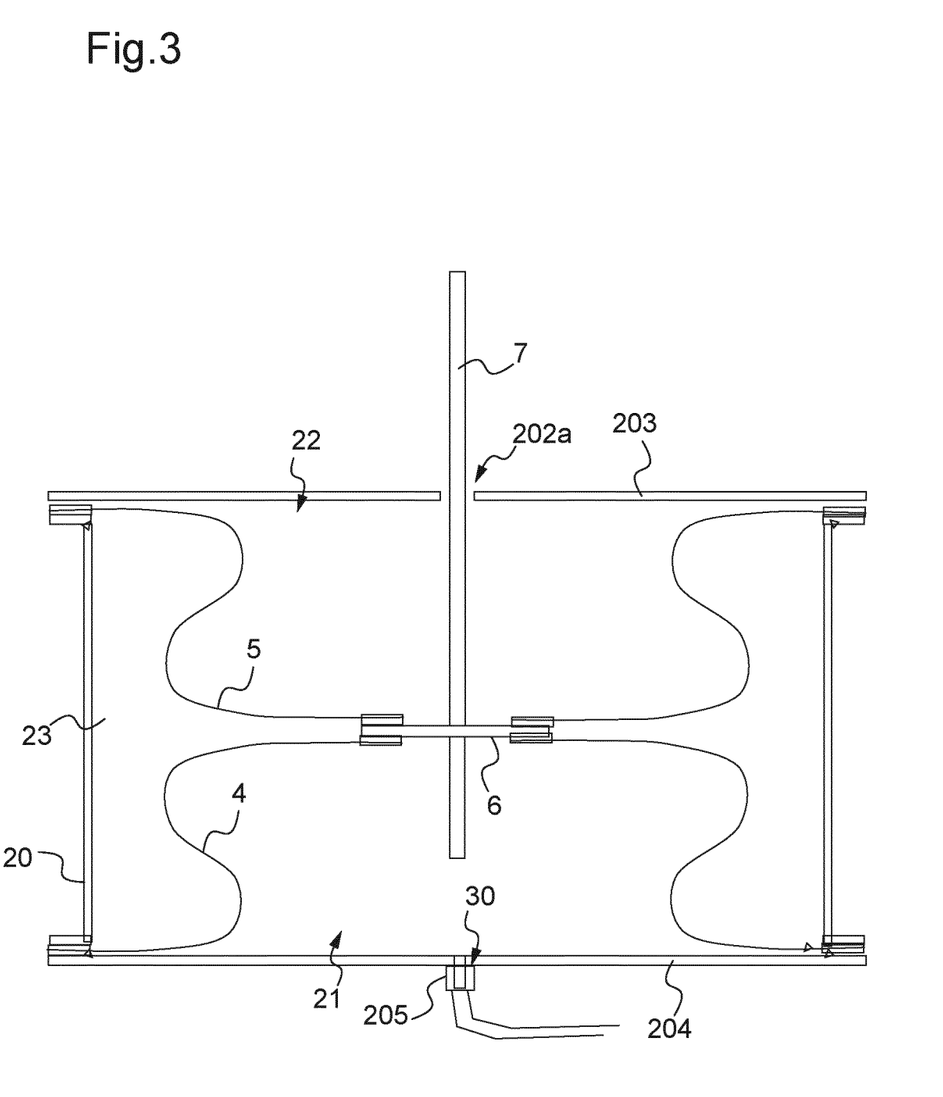
FIGS. 3 to 5 are schematic views of alternative pressure compensators according to the present invention, implementing different types of bellows, a secondary pressure compensator being also implemented in the embodiment of FIG. 5.

FIG. 3 represents an embodiment in which the first bellows 4 is an elastomer bellows and the second bellows 5 is also identical in shape and in its constituting material.

Figure 4:
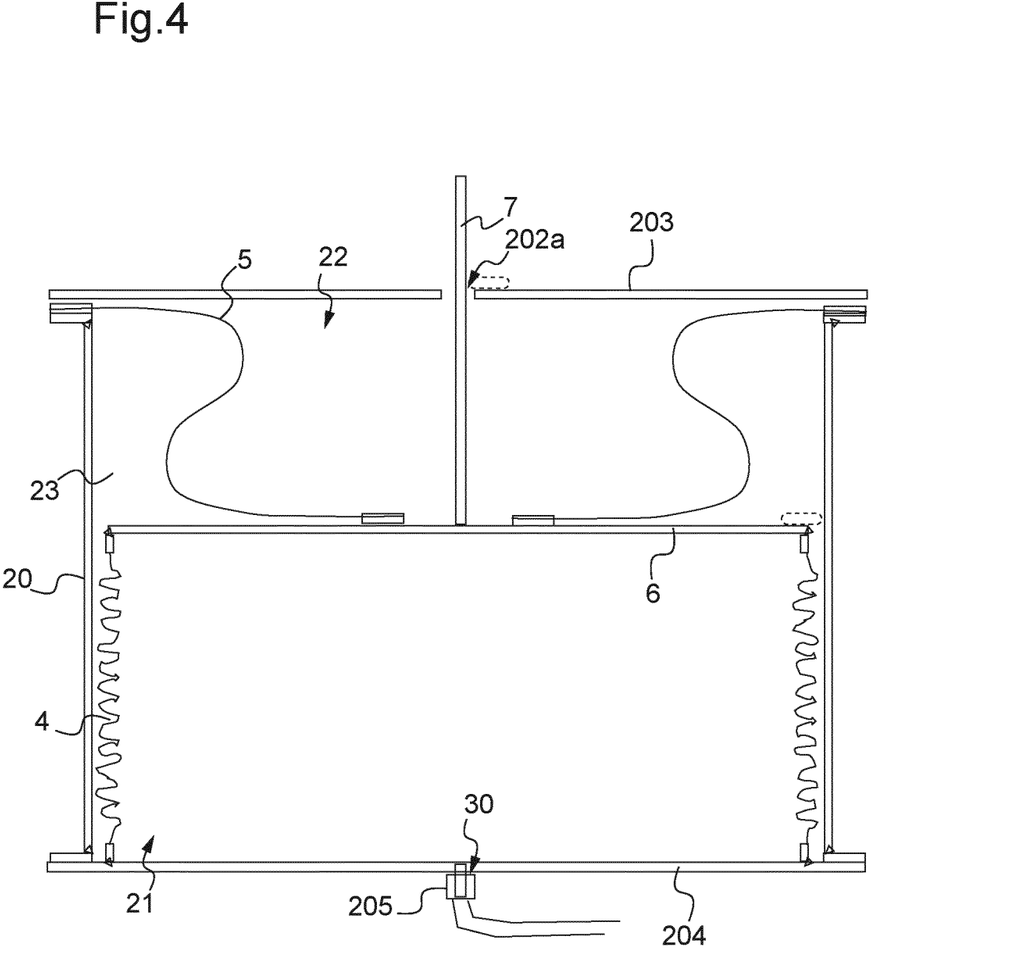

FIG. 4 represents an embodiment in which the first bellows 4 and the second bellows 5 are identical neither in shape nor in their constituting material. The first bellows 4 is a metal bellows and the second bellows 5 is an elastomer bellows.

The annular volume of the third compartment 23 is nearly constant. This is obtained thanks to the design of the pressure compensator wherein the first bellows and the second bellows are disposed one above the other inside a common housing, and the moving element 6 moves inside said housing. Thus, there is no need to compensate the annular volume of the third compartment 23.

In the pressure compensator 2 of FIGS. 1 to 5, the moving plate 6 is also connected to an extension rod 7.

The extension rod 7 has a fixed end 70 connected to the moving plate 6 and a free end 71 opposite to the fixed end 70.

The extension rod 7 extends here orthogonally to the moving plate 6. The extension rod 7 also passes through the through bore 202a of the housing 20 and therefore extends coaxially to the axis A.

Due to both bellows, the moving plate 6 translates relatively smoothly essentially in the direction of axis A.

The metal bellows of the different embodiments are moreover laterally maintained by the housing 20.

The extension rod 7 enables the monitoring of the level of oil inside the housing 20 but also helps aligning and guiding the moving plate 6 through the guiding of the extension rod 7 by bore 202a.

The extension rod 7 can be exchangeable, for example an extension rod having a given length can be used during filling of medium into the housing and testing, while another extension rod 7 can be installed when the transformer 1 is operating. The extension rod 7 used when the transformer 1 is operating shall preferably be shorter than the extension rod 7 used during filling and testing of the pressure compensator.

Moreover, the moving plate 6 can also be guided by the cylindrical wall of the housing 20, as shown for example by the embodiments of FIGS. 1 and 2. This guiding provides a second support point to the extension rod 7 in addition to the bore 202a, keeping therefore the extension rod 7 and the moving plate 6 in correct position for an easy movement. The moving plate 6 does however not fully extend out to the housing on the entire circumference. This enables the barrier fluid to circulate from one side of the moving plate to the other.

In another embodiment not represented here, the first bellows 4 and the second bellows 5 can have individual capped ends. The capped ends of the first bellows 4 and the second bellows 5 are joined together and installed in the housing 20. The capped ends hence form the moving element 6.

In the embodiment described above, when the first bellows 4 contracts axially of a given distance, the second bellows 5 expands of the same give distance, and vice versa.

In another embodiment, the free lengths of the first bellows 4 and the second bellows 5 can be defined so that both the first bellows 4 and the second bellows 5 are compressed 50% when the pressure compensator 2 is at nominal (mid) position.

The free lengths of the first bellows 4 and the second bellows 5 can also be defined so that one of the two bellows is at maximum allowable expansion when the other bellows is at maximum allowable compression.

The pressure compensator 2 can further comprise an elastic member 8 represented on FIG. 2. The elastic member 8 is here a spring sandwiched between the upper transverse plate 203 and the moving plate 6. The elastic member 8 extends around the extension rod 7. The elastic member 8 enables to pre-charge or pre-stress the compensator before use. Namely, the elastic member 8 is designed to provide a certain differential pressure between compensated dielectric fluid and ambient sea water and/or air during transportation and installation. In particular, the spring 8 can be sized to increase or reduce the differential pressure generated by the stiffness of the first bellows 4 and the second bellows 5.

As represented on FIG. 5 and in particular for high depths, the pressure compensator 2 can further comprise a small additional pressure compensator 11 with bellows in fluid communication with the barrier fluid in order to compensate the small variations of the volume of the barrier fluid, due to temperature variations that will transform into possible volume variation of the fluid.

It is moreover to be noted that in the embodiments of FIGS. 3 to 5, the through bore 202a for the extension rod 7 also serves for the ingress of seawater. In such a case, the extension rod 7 is only used for monitoring the level of dielectric fluid in the housing 20. That through bore 202a can in this case also have a diameter which is substantially greater than that shown on those figures.

This extension rod 7 can also extend on both sides of the moving plate 6 so as to form at a lower end a run stop for the moving plate 6.

As also appears from these embodiments, the distal ends 43, 53 can be sealingly fixed to the upper and lower plates 203, 204 of the housing 20, and the proximal ends 44, 54 ends of the bellows 4, 5 to the moving plate 6 by means of flanges, rings, cylindrical rings, annular elements having a L-shaped section, or a combination of those elements.

The direction of each end part of the bellows 4 (respectively 5), can hence be essentially parallel to axis A or essentially orthogonal to axis A.

Moreover, in the case of the use of two elastomer bellows as shown on FIG. 3, the diameter of the moving plate 6 can be substantially smaller than that of the housing 20.

It should be understood that various changes and modifications to the presently preferred embodiments described herein can be implemented. In particular, features a given embodiment can be implemented in another one, if useful.

The pressure compensator of FIG. 1 or 2 can also be replaced by any one of FIGS. 3 to 5.

Furthermore, the additional pressure compensator can be replaced by a bladder.

To enable the guiding of the moving plate by the housing while enabling the circulation of the barrier fluid, there may be openings between the moving plate and the cylindrical wall of the housing, openings in the moving plate itself or the housing may be provided with internal bars in contact with the outer rim of the moving plate, thereby creating openings between the housing and the moving plate. Other projections may of course also be foreseen in the housing or the moving plate.

The moving plate may also be formed with a lattice structure in an outer area.

Such structural features must of course be in the moving plate on the outside of where the bellows are fastened to the moving plate.

The invention claimed is:

1. A double barrier pressure compensator for performing a pressure compensation between seawater surrounding a subsea installation and a pressure compensation medium filling a volume of the subsea installation, the pressure compensator comprising:
    a housing having a first opening and a second opening;
    a first bellows and a second bellows arranged one above the other within the housing;
    a moving separation element adapted to move inside the housing, the moving separation element being positioned between the first and second bellows, and each of the first and second bellows having a first end sealingly fixed to the moving separation element and a second end sealingly fixed to the housing so as to define separate first and second compartments within the housing;
    wherein the first and second compartments are sealed with respect to each other and the pressure compensator further comprises a third compartment formed by a space between the housing and the first and second bellows;
    wherein the first compartment is fluidly connected to the volume of the subsea installation through the second opening and the second compartment is in communication with the seawater through the first opening;
    wherein said third compartment has a constant volume and
    wherein the barrier medium is a dielectric fluid.

2. The pressure compensator according to claim 1, wherein the housing comprises first and second spaced apart transverse plates and a cylinder extending between the first and second transverse plates, and wherein the first opening is located in said first transverse plate and the second opening is located in said second transverse plate.

3. The pressure compensator according to claim 1, wherein the moving separation element is a moving plate.

4. The pressure compensator according to claim 1, wherein the respective first and second ends of the first and second bellows are sealingly welded, soldered and/or flanged to the moving separation element and the housing, respectively.

5. The pressure compensator according to claim 1, further comprising a rod fixed to the moving separation element and protruding from the housing through a bore arranged therein, the rod being designed for monitoring a level of the pressure compensation medium inside the housing.

6. The pressure compensator according to claim 5, wherein said bore is an axial bore.

7. The pressure compensator according to claim 5, wherein the bore is adapted to guide a movement of the rod such that the rod aligns and guides a movement of the moving separation element.

8. The pressure compensator according to claim 1, wherein the moving separation element comprises an extension configured to contact an internal lateral face of the housing so as to help guide a movement of the moving separation element.

9. The pressure compensator according to claim 1, further comprising an elastic member positioned in the second compartment and sandwiched between the housing and the moving separation element to thereby pre-charge the compensator.

10. The pressure compensator according to claim 9, wherein the elastic member is a spring mounted on a rod.

11. The pressure compensator according to claim 1, further comprising a second pressure compensator with a bellows or a bladder, the second pressure compensator being connected to the pressure compensator for compensating variations of the volume of the barrier medium in the third compartment.

12. The pressure compensator according to claim 1, wherein the pressure compensation medium is a dielectric fluid.

13. A subsea assembly comprising a subsea installation and a pressure compensator for performing a pressure compensation between seawater surrounding the subsea installation and a pressure compensation medium filling a volume of the subsea installation, the pressure compensator comprising:
    a housing having first and second openings;
    first and second bellows arranged one above the other within the housing;
    a moving separation element adapted to move inside the housing, the moving separation element being positioned between the first and second bellows, and each of the first and second bellows having a first end sealingly fixed to the moving separation element and a second end sealingly fixed to the housing so as to define separate first and second compartments within the housing;
    wherein the first and second compartments are sealed with respect to each other and the pressure compensator further comprises a third compartment formed by a space between the housing and the first and second bellows;
    wherein the first compartment is fluidly connected to the volume of the subsea installation through the second opening and the second compartment is in communication with the seawater through the first opening;
    wherein said third compartment has a constant volume and
    wherein the barrier medium is a dielectric fluid.

14. The subsea assembly according to claim 13, wherein the housing is mounted on the subsea installation and the second opening is common to the pressure compensator and a tank of the subsea installation.

15. The subsea assembly according to claim 13, wherein the housing comprises first and second spaced apart transverse plates and a cylinder extending between the first and second transverse plates, and wherein the first opening is located in said first transverse plate and the second opening is located in said second transverse plate.

16. The subsea assembly according to claim 13, wherein the moving separation element is a moving plate.

17. The subsea assembly according to claim 13, wherein the respective first and second ends of the first and second bellows are sealingly welded, soldered and/or flanged to the moving separation element and the housing, respectively.

18. The subsea assembly according to claim 13, further comprising a rod fixed to the moving separation element and protruding from the housing through a bore arranged therein, the rod being designed for monitoring a level of the pressure compensation medium inside the housing.

19. The subsea assembly according to claim 18, wherein the bore is adapted to guide a movement of the rod such that the rod aligns and guides a movement of the moving separation element.

20. The subsea assembly according to claim 13, wherein the moving separation element comprises an extension configured to contact an internal lateral face of the housing so as to help guide a movement of the moving separation element.

21. The subsea assembly according to claim 13, further comprising an elastic member positioned in the second compartment and sandwiched between the housing and the moving separation element to thereby pre-charge the compensator.

22. The subsea assembly according to claim 21, wherein the elastic member is a spring mounted on a rod.

23. The subsea assembly according to claim 13, further comprising a second pressure compensator with a bellows or a bladder, the second pressure compensator being connected to the pressure compensator for compensating variations of the volume of the barrier medium in the third compartment.

* * * * *